United States Patent
Maz

(10) Patent No.: US 11,217,204 B2
(45) Date of Patent: Jan. 4, 2022

(54) DYNAMICALLY ADJUSTING IMAGE CHARACTERISTICS IN REAL-TIME

(71) Applicant: CAE Inc., Saint-Laurent (CA)

(72) Inventor: Emmanuel Maz, Saint-Laurent (CA)

(73) Assignee: CAE Inc., Saint-Laurent (CA)

( * ) Notice: Subject to any disclaimer, the term of this patent is extended or adjusted under 35 U.S.C. 154(b) by 0 days.

(21) Appl. No.: 16/224,889

(22) Filed: Dec. 19, 2018

(65) Prior Publication Data

US 2020/0202812 A1    Jun. 25, 2020

(51) Int. Cl.
| | |
|---|---|
| *G09G 5/10* | (2006.01) |
| *H04N 9/31* | (2006.01) |
| *G06F 3/01* | (2006.01) |
| *G09G 5/14* | (2006.01) |
| *G09B 9/30* | (2006.01) |

(52) U.S. Cl.
CPC .............. *G09G 5/10* (2013.01); *G06F 3/011* (2013.01); *G09G 5/14* (2013.01); *H04N 9/3147* (2013.01); *G09B 9/302* (2013.01); *G09G 2320/066* (2013.01); *G09G 2320/0686* (2013.01); *G09G 2320/0693* (2013.01); *G09G 2354/00* (2013.01)

(58) Field of Classification Search
CPC ........................... H04N 1/6005; H04N 9/3147
See application file for complete search history.

(56) References Cited

U.S. PATENT DOCUMENTS

| | | | |
|---|---|---|---|
| 7,404,645 B2 | 7/2008 | Margulis | |
| 2007/0141538 A1 | 6/2007 | Quinn et al. | |
| 2012/0299817 A1* | 11/2012 | Atkins | H04N 13/373 345/156 |
| 2014/0160014 A1 | 6/2014 | Dominici et al. | |
| 2015/0116203 A1* | 4/2015 | Narita | G06T 5/002 345/156 |
| 2016/0205391 A1* | 7/2016 | Kim | G09G 3/3225 348/51 |
| 2016/0261831 A1 | 9/2016 | Coleman et al. | |
| 2017/0110023 A1 | 4/2017 | Bell et al. | |
| 2017/0163900 A1* | 6/2017 | Gaetje | G02C 7/12 |
| 2018/0033399 A1* | 2/2018 | Kawashima | G02F 1/133553 |
| 2018/0286125 A1* | 10/2018 | Ireland | G06T 5/50 |
| 2019/0124307 A1* | 4/2019 | Oike | H04N 9/3182 |
| 2019/0205081 A1* | 7/2019 | Zhu | G09G 5/00 |

* cited by examiner

*Primary Examiner* — Phi Hoang

(74) *Attorney, Agent, or Firm* — Matthew Roy; Gowling WLG (Canada) LLP

(57) ABSTRACT

A method and display system for dynamically adjusting image characteristics in real-time for a user therein. In real-time, a determination is made of a dynamic user position facing one or more fixed display screens. In real-time, and taking into account the dynamic user position, luminance of a plurality of zones is adjusted in a stream of images computed for display on the one or more fixed display screens. The calibrated (or adjusted) stream of images is then displayed onto the one or more fixed display screens. A relative view angle between the dynamic user position and the one or more fixed display screens may be determined taking into account in real-time while adjusting luminance. Adjusting in real-time, taking into account the dynamic user position, may also be performed on color properties of the plurality of zones in the stream of images.

18 Claims, 6 Drawing Sheets

DYNAMICALLY ADJUSTING IMAGE CHARACTERISTICS IN REAL-TIME

TECHNICAL FIELD

The present invention relates to a display systems and, more particularly, to display systems that take into account a user's position.

BACKGROUND

In interactive computer simulation, which are used for training users, an important aspect that makes the difference between successful and unsuccessful training is to credibly replicate an actual environment, which facilitates and helps maintaining immersion. Most interactive computer simulation rely on images being displayed to replicate at least partially the environment of operation of the user or trainee. In order to remain credible, the image generation in the interactive computer simulation is therefore one of the critical systems. Unfortunately, because of technical shortcomings in the solutions available today, the perceived immersivity of the user in the system is affected by the position of the user in the system.

The present invention helps to address this shortcoming.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is directed to a computing platform configured for dynamically adjusting image characteristics in real-time for user in a system. The computing platform includes a non-transient computer-readable storage medium having executable instructions embodied thereon. The computing platform includes one or more hardware processors configured to execute the instructions. The processor(s) execute the instructions to determine in real-time a dynamic user position facing one or more fixed display screens. The processor(s) execute the instructions to calibrate in real-time, taking into account the dynamic user position, luminance of a plurality of zones in a stream of images computed for display on the one or more fixed display screens. The processor(s) execute the instructions to display the calibrated stream of images onto the one or more fixed display screens.

In some implementations of the computing platform, determining the dynamic user position may further include determining, in real-time, a relative view angle between the dynamic user position and the one or more fixed display screens. In some implementations of the computing platform, adjusting in real-time the luminance of the plurality of zones in the stream of images may be further performed taking into account the relative view angle.

In some implementations of the computing platform, the processor(s) may execute the instructions to reduce in real-time, taking into account the relative view angle, luminance of one or more zones outside of a field of view defined for the user thereby improving image contrast in the plurality of zones in the stream of images. Additionally or alternatively, luminance of one or more zones inside of the field of view defined for the user may also be reduced.

In some implementations of the computing platform, displaying the calibrated stream of images onto the one or more fixed display screens may be performed using a plurality of projectors and the plurality of zones may include a blend zone on the one or more fixed display screens caused by at least one overlap between the plurality of projectors.

In some implementations of the computing platform, the plurality of zones may include at least one non-blend zone on a single screen of the one or more fixed display screens.

In some implementations of the computing platform, the processor(s) may execute the instructions to calibrate in real-time, taking into account the dynamic user position, color properties of the plurality of zones in the stream of images computed for display on the one or more fixed display screens.

In some implementations of the computing platform, the processor(s) may execute the instructions to acquire luminance samples from a plurality of expected user positions in the system and adjusting the luminance in real-time may be performed considering one or more of the acquired luminance samples. In some implementations of the computing platform, determining in real-time the dynamic user position may be performed by interpolating the dynamic user position between two or more sampled view angles.

In some implementations of the computing platform, the stream of images may include at least a second stream of images discernible in the stream of images by a second user. In some implementations of the computing platform, the processor(s) may execute the instructions to determine in real-time a second dynamic user position facing the one or more fixed display screens. In some implementations of the computing platform, the processor(s) may execute the instructions to calibrate in real-time, taking into account the second dynamic user position, luminance of the plurality of zones in the second stream of images computed for display on the one or more fixed display screens.

Another aspect of the present disclosure is directed to a method for dynamically adjusting image characteristics in real-time for user in a system. The method includes determining in real-time a dynamic user position facing one or more fixed display screens. The method also includes adjusting in real-time, taking into account the dynamic user position, luminance of a plurality of zones in a stream of images computed for display on the one or more fixed display screens. The method includes displaying the calibrated stream of images onto the one or more fixed display screens.

In some implementations of the method, determining the dynamic user position may further include determining, in real-time, a relative view angle between the dynamic user position and the one or more fixed display screens. In some implementations of the method, adjusting in real-time the luminance of the plurality of zones in the stream of images may be further performed taking into account the relative view angle.

Some implementations of the method may further include reducing in real-time, taking into account the relative view angle, luminance of one or more zones outside of a field of view defined for the user thereby improving image contrast in the plurality of zones in the stream of images.

In some implementations of the method, displaying the calibrated stream of images onto the one or more fixed display screens may be performed using a plurality of projectors and the plurality of zones may include a blend zone on the one or more fixed display screens caused by at least one overlap between the plurality of projectors.

In some implementations of the method, the plurality of zones may include at least one non-blend zone on a single screen of the one or more fixed display screens.

Some implementations of the method may further include adjusting in real-time, taking into account the dynamic user position, color properties of the plurality of zones in the stream of images computed for display on the one or more fixed display screens.

Some implementations of the method may further include acquiring luminance samples from a plurality of expected user positions in the system and adjusting the luminance in real-time may be performed considering one or more of the acquired luminance samples. In some implementations of the method, determining in real-time the dynamic user position may be performed by interpolating the dynamic user position between two or more sampled view angles.

In some implementations of the method, the stream of images may include at least a second stream of images discernible in the stream of images by a second user. In some implementations, the method may include determining in real-time a second dynamic user position facing the one or more fixed display screens. In some implementations, the method may include adjusting in real-time, taking into account the second dynamic user position, luminance of the plurality of zones in the second stream of images computed for display on the one or more fixed display screens.

Yet another aspect of the present disclosure relates to a system configured for dynamically adjusting image characteristics in real-time for user in a system. The system includes one or more hardware processors configured by machine-readable instructions. The processor(s) are configured to determine in real-time a dynamic user position facing one or more fixed display screens, to calibrate in real-time, taking into account the dynamic user position, luminance of a plurality of zones in a stream of images computed for display on the one or more fixed display screens and to display the calibrated stream of images onto the one or more fixed display screens.

In some implementations of the system, determining the dynamic user position may further include determining, in real-time, a relative view angle between the dynamic user position and the one or more fixed display screens. In some implementations of the system, adjusting in real-time the luminance of the plurality of zones in the stream of images may be further performed taking into account the relative view angle.

In some implementations of the system, the processor(s) may be configured to reduce in real-time, taking into account the relative view angle, luminance of one or more zones outside of a field of view defined for the user thereby improving image contrast in the plurality of zones in the stream of images.

In some implementations of the system, displaying the calibrated stream of images onto the one or more fixed display screens may be performed using a plurality of projectors and the plurality of zones may further include a blend zone on the one or more fixed display screens caused by at least one overlap between the plurality of projectors.

In some implementations of the system, the plurality of zones may include at least one non-blend zone on a single screen of the one or more fixed display screens.

In some implementations of the system, the processor(s) may be configured to calibrate in real-time, taking into account the dynamic user position, color properties of the plurality of zones in the stream of images computed for display on the one or more fixed display screens.

In some implementations of the system, the processor(s) may be configured to acquire luminance samples from a plurality of expected user positions in the system and adjusting the luminance in real-time may be performed considering one or more of the acquired luminance samples. In some implementations of the system, determining in real-time the dynamic user position may be performed by interpolating the dynamic user position between two or more sampled view angles.

In some implementations of the system, the stream of images may include at least a second stream of images discernible in the stream of images by a second user. In some implementations of the system, the processor(s) may be configured to determine in real-time a second dynamic user position facing the one or more fixed display screens. In some implementations of the system, the processor(s) may be configured to calibrate in real-time, taking into account the second dynamic user position, luminance of the plurality of zones in the second stream of images computed for display on the one or more fixed display screens.

Still another aspect of the present disclosure relates to a non-transient computer-readable storage medium having instructions embodied thereon, the instructions being executable by one or more processors to perform a method for dynamically adjusting image characteristics in real-time for user in a system. The method includes determining in real-time a dynamic user position facing one or more fixed display screens, adjusting in real-time, taking into account the dynamic user position, luminance of a plurality of zones in a stream of images computed for display on the one or more fixed display screens and displaying the calibrated stream of images onto the one or more fixed display screens.

In some implementations of the computer-readable storage medium, determining the dynamic user position may further include determining, in real-time, a relative view angle between the dynamic user position and the one or more fixed display screens. In some implementations of the computer-readable storage medium, adjusting in real-time the luminance of the plurality of zones in the stream of images may be further performed taking into account the relative view angle.

In some implementations of the computer-readable storage medium, the method may include further including reducing in real-time, taking into account the relative view angle, luminance of one or more zones outside of a field of view defined for the user thereby improving image contrast in the plurality of zones in the stream of images.

In some implementations of the computer-readable storage medium, displaying the calibrated stream of images onto the one or more fixed display screens may be performed using a plurality of projectors and the plurality of zones may include a blend zone on the one or more fixed display screens caused by at least one overlap between the plurality of projectors.

In some implementations of the computer-readable storage medium, the plurality of zones may include at least one non-blend zone on a single screen of the one or more fixed display screens.

In some implementations of the computer-readable storage medium, the method may further include adjusting in real-time, taking into account the dynamic user position, color properties of the plurality of zones in the stream of images computed for display on the one or more fixed display screens.

In some implementations of the computer-readable storage medium, the method may further include acquiring luminance samples from a plurality of expected user positions in the system and adjusting the luminance in real-time may be performed considering one or more of the acquired luminance samples. In some implementations of the computer-readable storage medium, determining in real-time the dynamic user position may be performed by interpolating the dynamic user position between two or more sampled view angles.

In some implementations of the computer-readable storage medium, the stream of images may include at least a second stream of images discernible in the stream of images by a second user. In some implementations of the computer-readable storage medium, the method may include determining in real-time a second dynamic user position facing the one or more fixed display screens. In some implementations of the computer-readable storage medium, the method may include adjusting in real-time, taking into account the second dynamic user position, luminance of the plurality of zones in the second stream of images computed for display on the one or more fixed display screens.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
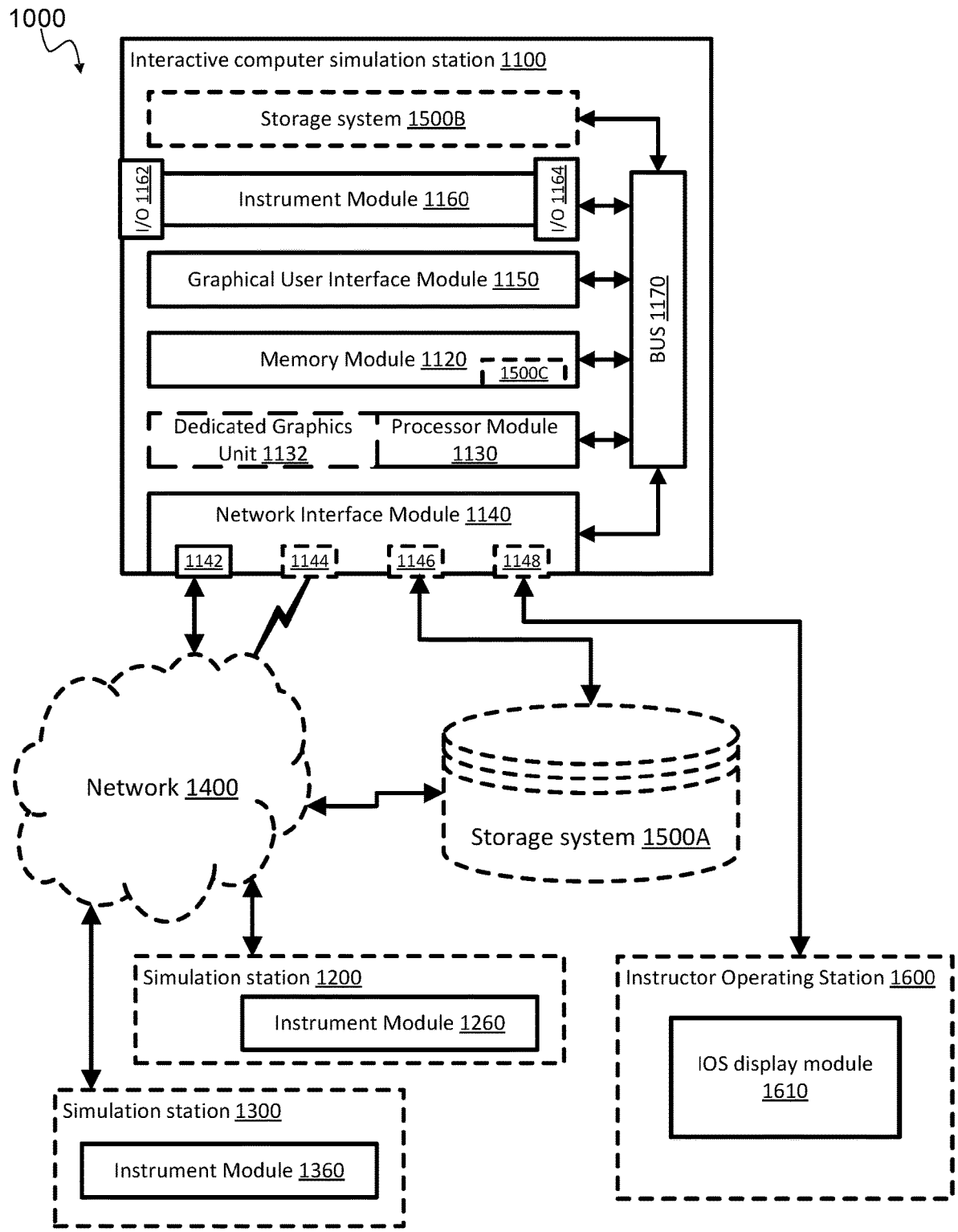
FIG. 1 is a modular view of an exemplary interactive computer simulation system in accordance with the teachings of the present invention.

Development of the different embodiments of the present invention has been triggered by, among other things, differences in image characteristics (e.g., luminance, colors, contrast, etc.) depending on the user's position in an interactive flight computer simulation station used for training purposes. At this time, the display system in the interactive flight computer simulation station is calibrated/optimized for fixed trainee positions. When a trainee moves (e.g., head movement while remaining seated) during execution of an interactive flight simulation, the differences in image characteristics negatively affect immersivity of the training session, thereby potentially affecting its effectiveness.

As such, the present invention relate to modification/enhancement of images rendered in a display system. For the purpose of explaining and exemplifying the teachings of the present invention, reference is made to modification/enhancement of images rendered in the context of an interactive computer simulation for which the characteristics of the underlying computer simulation system are well known. Specific challenges related to interactive computer simulation are also discussed, but skilled persons will recognize that some of these challenges equally apply to other situations (e.g., virtual reality solutions in the context of training, entertainment and/or gaming).

That is to say that the challenges answered by the present invention do not relate to the proper tracking and positioning of visual element(s) in an existing image (e.g., from a video feed or pre-rasterized), but by the proper onscreen-depiction of the images considering various factors comprising at the least the user's position determined in real-time (or real-time priority processing) while the user views the displayed images (e.g., during execution of the interactive computer simulation).

Once looking for a solution to the aforementioned issues, different cooperating, yet potentially independent solutions have been developed. The skilled person will readily acknowledge that features described in the context of one of the embodiments of the invention can be adapted and used in the context of other embodiments.

In one set of embodiments, a dynamic image characteristics adjustment computer system and related method are provided. The image characteristics (e.g., luminance, contrast, colors, etc.) are dynamically adapted based on a user's position in the system (e.g., eyes position as directly determined or through extrapolation). Another factor considered is the characteristics of the display screens/light emitting device (i.e., position of the screen itself and/or projectors towards the screen). In some embodiments, the position and characteristics of the display screen are fixed (e.g., fixed projectors on a given side of a curved screens). However, in other embodiments, in addition to the user's position, the image characteristics could be further adjusted dynamically considering the dynamic characteristics of the display screen (e.g., rotating display screen, moving projector(s), variable display screen texture, etc.).

Image characteristics are therefore adjusted by dynamically adjusting at least the luminance of images and optionally otherwise enhancing and/or filtering the images considering the characteristics of the screen on which the images are displayed from the perspective of the user (i.e., the user's position). The image characteristics may also be parameterized considering one or more additional dynamic aspects. For instance, dynamic aspects may include identity/preferences of the user; experience/previously measured skills of the trainee of an interactive computer simulation; relative colors present or expect to be present in the stream of images; purpose of the images (training session, film, corporate video, etc.); dynamic ambient lighting conditions; parametrized scene type (e.g., night scene, desert scene, snow scene), etc.

In certain embodiments (e.g., related to interactive flight simulation stations), the dynamic adjustment of the image characteristics made from the perspective of the user (i.e., the user's position) allow for smaller stations (i.e., limited footprint) compared to conventional systems due to the fact that the screens displaying the images can be brought closer to the user without diminishing the perceived credibility of the images. That is, certain embodiments allow to maintain a similar immersive experience for the user in an interactive computer simulation station by dynamically adjusting of the image characteristics even though the interactive computer simulation station is reduced in size compared to conventional systems. The reduction in size of the station may then lead, for instance, to increased density of stations (e.g., when many stations are present in a single site) and/or to better energy consumption per station (e.g., less air to condition, smaller screen(s) needing less powerful image display systems and/or reduced mass of the system to be displaced by hydraulic movement systems).

Reference is now made to the drawings in which FIG. 1 shows a logical modular representation of a display system exemplified by an interactive computer simulation system 1000 performing one or more interactive computer simulations (such as interactive flight, land and/or marine simulations), in accordance with the teachings of the present invention. The interactive computer simulation system 1000 comprises an interactive computer simulation station 1100, which may be involved in one or more of the interactive computer simulations.

In the depicted example of FIG. 1, the interactive computer simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain expected realism of such immersive simulation (e.g., between 5 and 60 or even 120 images rendered per seconds or maximum between 8.3 ms and 200 ms for each rendered image). In some embodiments, each of the simulation stations 1100, 1200, 1300 comprise a processor module having a dedicated graphics processing unit similar to the dedicated graphics processing unit 1132. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the interactive computer simulation station 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the interactive computer simulation station 1100. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the interactive computer simulation station 1100 to perform routine as well as innovative steps related to the present invention.

The interactive computer simulation station 1100 also comprises a Graphical User Interface (GUI) module 1150 comprising one or more display screen(s) forming a display system, for the interactive computer simulation station 1100. The display screens of the GUI module 1150 could be split into one or more flat panels, but could also be a single flat or curved screen visible from an expected user position (not shown) in the simulation computing device. For instance, the GUI module 1150 may comprise one or more mounted projectors for projecting images on a curved refracting screen. The curved refracting screen may be located far enough from the user of the interactive computer program to provide a collimated display. Alternatively, the curved refracting screen may provide a non-collimated display. Skilled person will readily understand that the GUI module 1150 may be used in a variety of contexts not limited to the previously mentioned examples (e.g., rear projector on translucent screen, front projector or regular screen, wearable display system, etc.).

The interactive computer simulation system 1000 comprises a storage system 1500 that comprises data related to a shared computer generated environment and that may further log dynamic data while the interactive computer simulation is performed. FIG. 1 shows examples of the storage system 1500 as a distinct database system 1500A, a distinct module 1500B of the interactive computer simulation station 1100 or a sub-module 1500C of the memory module 1120 of the interactive computer simulation station 1100. The storage system 1500 may also comprise storage modules (not shown) on the simulation stations 1200, 1300. The storage system 1500 may be distributed over different systems A, B, C and/or the simulations stations 1100, 1200, 1300 or may be in a single system. The storage system 1500 may comprise one or more logical or physical as well as local or remote hard disk drive (HDD) (or an array thereof). The storage system 1500 may further comprise a local or remote database made accessible to the computer system 1100 by a standardized or proprietary interface or via the network interface module 1140. The variants of storage system 1500 usable in the context of the present invention will be readily apparent to persons skilled in the art.

An Instructor Operating Station (IOS) 1600 may be provided for allowing various management tasks to be performed in the interactive computer simulation system 1000. The tasks associated with the IOS 1600 allow for control and/or monitoring of one or more ongoing interactive computer simulations. For instance, the IOS 1600 may be used for allowing an instructor to participate to the interactive computer simulation and possibly additional interactive computer simulation(s). In some embodiments, the IOS 1600 may be provided by the interactive computer simulation station 1100. In other embodiments, the IOS 1600 may be co-located with the interactive computer simulation station 1100 (e.g., within the same room or simulation enclosure) or remote therefrom (e.g., in different rooms or in different locations). Skilled persons will understand the many instances of the IOS 1600 may be concurrently provided in the interactive computer simulation system 1000. The IOS 1600 may provide a computer simulation management interface, which may be displayed on a dedicated IOS display module 1610 or the GUI module 1150. The IOS 1600 could be located in close proximity with the simulation computing device, but may also be provided outside of the interactive computer simulation station 1100, in communication therewith.

The IOS display module 1610 may comprise one or more display screens such as a wired or wireless flat screen, a wired or wireless touch-sensitive display, a tablet computer, a portable computer or a smart phone. When multiple interactive computer simulation station 1100, 1200 and/or 1300 are present in the computer system 1000, the IOS 1600 may present different views of the computer program management interface (e.g., to manage different aspects therewith) or they may all present the same view thereof. The computer program management interface may be permanently shown on a first of the screens of the IOS display module 1610 while a second of the screen of the IOS display module 1610 shows a view of the interactive computer simulation (i.e., adapted view considering the second screen from images displayed through the GUI module 1150). The computer program management interface may also be triggered on the IOS 1600, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation computing device. A virtualized IOS (not shown) may also be provided to the user on the GUI module 1150 (e.g., on a main screen, on a secondary screen or a dedicated screen thereof). In some embodiments, a Brief and Debrief System (BDS) may also be provided. The BDS may be seen as a version of the IOS 1600 used during playback of recorded data only.

In certain embodiments, the IOS 1600 may be used, e.g., by the instructor in order to fulfill certain objectives of a particular simulation or training scenario, to insert or modify a visual element (e.g., add a target aircraft, change the aircraft from one type to another (e.g., different manufacturer or different allegiance), etc.) and/or to modify the behavior of a visual element (e.g., modify the direction of an aircraft, modify armament status of an aircraft, etc.). One or more of the visual elements displayed through the GUI module 1500 may represent other simulated elements (e.g., a simulated aircraft controlled from the simulation station 1200). In addition, or alternatively, one or more of the visual elements displayed through the GUI module 1500 may follow a predefined behavioral pattern (e.g., controlled using artificial intelligence), in line with objectives of a particular simulation or training scenario.

The tangible instrument provided by the instrument modules 1160, 1260 and/or 1360 are tightly related to the element being simulated. In the example of the simulated aircraft system, for instance in relation to an exemplary flight simulator embodiment, the instrument module 1160 may comprise a control yoke and/or side stick, rudder pedals, a throttle, a flap switch, a transponder, a landing gear lever, a parking brake switch, aircraft instruments (air speed indicator, attitude indicator, altimeter, turn coordinator, vertical speed indicator, heading indicator, . . . ), etc. Depending on the type of simulation (e.g., level of immersivity), the tangible instruments may be more or less realistic compared to those that would be available in an actual aircraft. For instance, the tangible instrument provided by the modules 1160, 1260 and/or 1360 may replicate an actual aircraft cockpit where actual instruments found in the actual aircraft or physical interfaces having similar physical characteristics are provided to the user (or trainee). As previously described, the actions that the user or trainee takes with one or more of the tangible instruments provided via the instrument module(s) 1160, 1260 and/or 1360 (modifying lever positions, activating/deactivating switches, etc.) allow the user or trainee to control the virtual simulated element in the interactive computer simulation. In the context of an immersive simulation being performed in the interactive computer simulation system 1000, the instrument module 1160, 1260 and/or 1360 would typically support a replicate of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training, marine simulator for lookout training, etc.), skilled persons will readily recognize and be able to apply its teachings to other types of interactive computer simulations.

In some embodiment, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the interactive computer simulation station 1100. The external input/output (I/O) module 1162 of the instrument module 1160, 1260 and/or 1360 may connect one or more external tangible instruments (not shown) therethrough. The external I/O module 1162 may be required, for instance, for interfacing the interactive computer simulation system 1000 with one or more tangible instrument identical to an Original Equipment Manufacturer (OEM) part that cannot be integrated into the interactive computer simulation station 1100 and/or the simulation station(s) 1200, 1300 (e.g., a tangible instrument exactly as the one that would be found in the actual system subject of the interactive simulation). The internal input/output (I/O) module 1162 of the instrument module 1160, 1260 and/or 1360 may connect one or more tangible instruments integrated with the instrument module 1160, 1260 and/or 1360. The I/O 1162 may comprise necessary interface(s) to exchange data, set data or get data from such integrated tangible instruments. The internal I/O module 1162 may be required, for instance, for interfacing the interactive computer simulation system 1000 with one or more integrated tangible instrument identical to an Original Equipment Manufacturer (OEM) part (e.g., a tangible instrument exactly as the one that would be found in the actual system subject of the interactive simulation). The I/O 1162 may comprise necessary interface(s) to exchange data, set data or get data from such integrated tangible instruments.

The instrument module 1160 may comprise one or more physical module that may further be interconnected to provide a given configuration of the interactive computer program. As can be readily understood, instruments of the instrument module 1160 are expected to be manipulated by the user of the interactive computer simulation to input commands thereto.

The instrument module 1160 may yet also comprise a mechanical instrument actuator (not shown) providing one or more mechanical assemblies for physically moving one or more of the tangible instruments of the instrument module 1160 (e.g., electric motors, mechanical dampeners, gears, levers, etc.). The mechanical instrument actuator may receive one or more sets of instructions (e.g., from the processor module 1130) for causing one or more of the instruments to move in accordance with a defined input function. The mechanical instrument actuator of the instrument module 1160 may also alternatively or in addition be used for providing feedback (e.g., visual, haptic, . . . ) to the user of the interactive computer simulation through tangible and/or simulated instrument(s) (e.g., touch screens, or replicated elements of an aircraft cockpit or of an operating room). Additional feedback devices may be provided with the interactive computer simulation station 1100 or in the interactive computer simulation system 1000 (e.g., vibration of an instrument, physical movement of a seat of the user and/or physical movement of the whole system, etc.).

The interactive computer simulation station 1100 may also comprise one or more seats (not shown) or other ergonomically designed tools (not shown) to assist the user of the interactive computer simulation in getting into proper position to gain access to some or all of the instrument module 1160.

In the depicted example of FIG. 1, the interactive computer simulation system 1000 shows optional interactive computer simulation stations 1200, 1300, which may communicate through the network 1400 with the interactive computer simulation station 1100. The stations 1200, 1300 may be associated to the same instance of the interactive computer simulation with a shared computer generated environment where users of the interactive computer simulation station 1100 and stations 1200, 1300 may interact with one another in a single simulation. The single simulation may also involve other simulation computing device(s) (not shown) co-located with the simulation computing device or remote therefrom. The simulation computing device and stations 1200, 1300 may also be associated with different instances of the interactive computer simulation, which may further involve other simulation computing device(s) (not shown) co-located with the interactive computer simulation station 1100 or remote therefrom.

In the context of the depicted embodiments, runtime execution, real-time execution or real-time priority processing execution corresponds to operations executed during the interactive computer simulation that may have an impact on the perceived quality of the interactive computer simulation from a user perspective. An operation performed at runtime, in real-time or using real-time priority processing thus typically needs to meet certain performance constraints that may be expressed, for instance, in terms of maximum time, maximum number of frames, and/or maximum number of processing cycles. For instance, in an interactive simulation having a frame rate of 60 frames per second, it is expected that a modification performed within 5 to 10 frames will appear seamless to the user. Likewise, in an interactive simulation having a frame rate of 120 frames per second, it is expected that a modification performed within 10 to 20 frames will appear seamless to the user. Skilled persons will readily recognize that real-time processing may not actually be achievable in absolutely all circumstances in which rendering images is required. The real-time priority processing required for the purpose of the disclosed embodiments relates to perceived quality of service by the user of the interactive computer simulation, and does not require absolute real-time processing of all dynamic events, even if the user was to perceive a certain level of deterioration of quality of service that would still be considered plausible.

A simulation network (e.g., overlaid on the network 1400) may be used, at runtime (e.g., using real-time priority processing or processing priority that the user perceives as real-time), to exchange information (e.g., event-related simulation information). For instance, movements of a vehicle associated to the interactive computer simulation station 1100 and events related to interactions of a user of the interactive computer simulation station 1100 with the interactive computer generated environment may be shared through the simulation network. Likewise, simulation-wide events (e.g., related to persistent modifications to the interactive computer generated environment, lighting conditions, modified simulated weather, etc.) may be shared through the simulation network from a centralized computer system (not shown) or from one of the stations 1100, 1200, 1300. In addition, the storage module 1500 (e.g., a networked database system) accessible to all components of the interactive computer simulation system 1000 involved in the interactive computer simulation may be used to store data necessary for rendering interactive computer generated environment. In some embodiments, the storage module 1500 is only updated from the centralized computer system and the simulation computing device and stations 1100, 1200, 1300 only load data therefrom.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

During execution of the interactive computer simulation, the method 200 described hereinbelow may be performed in the interactive computer simulation system 1000.

The present invention is not affected by the manner in which the different modules exchange information between them. For instance, the memory module and the processor module could be connected by a parallel bus, but could also be connected by a serial connection or involve an intermediate module (not shown) without affecting the teachings of the present invention.

Figure 4A:
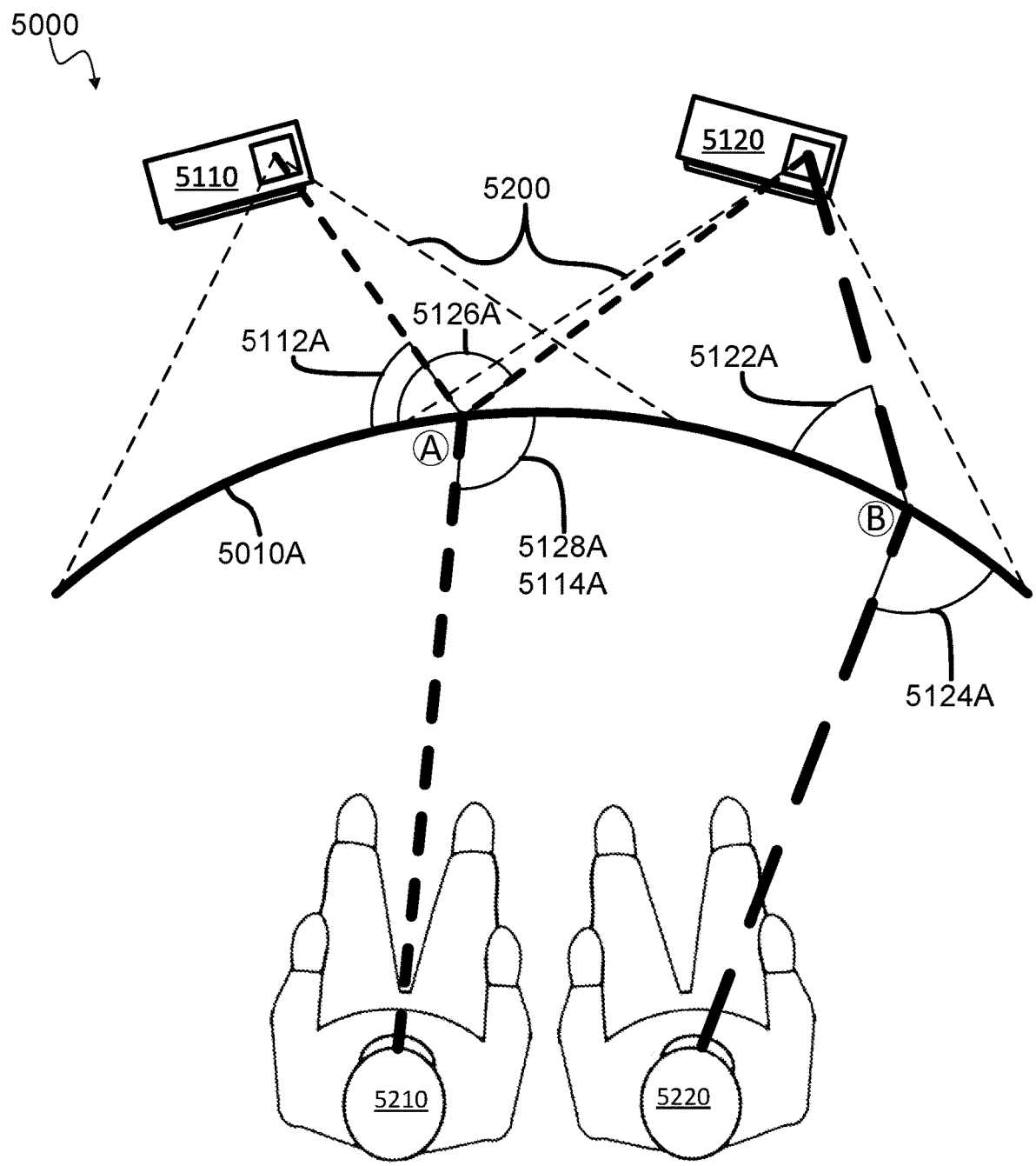
FIG. 4A, FIG. 4B and FIG. 4C herein referred to concurrently as FIG. 4 are top views of exemplary display systems in accordance with the teachings of the present invention.
Figure 4B:
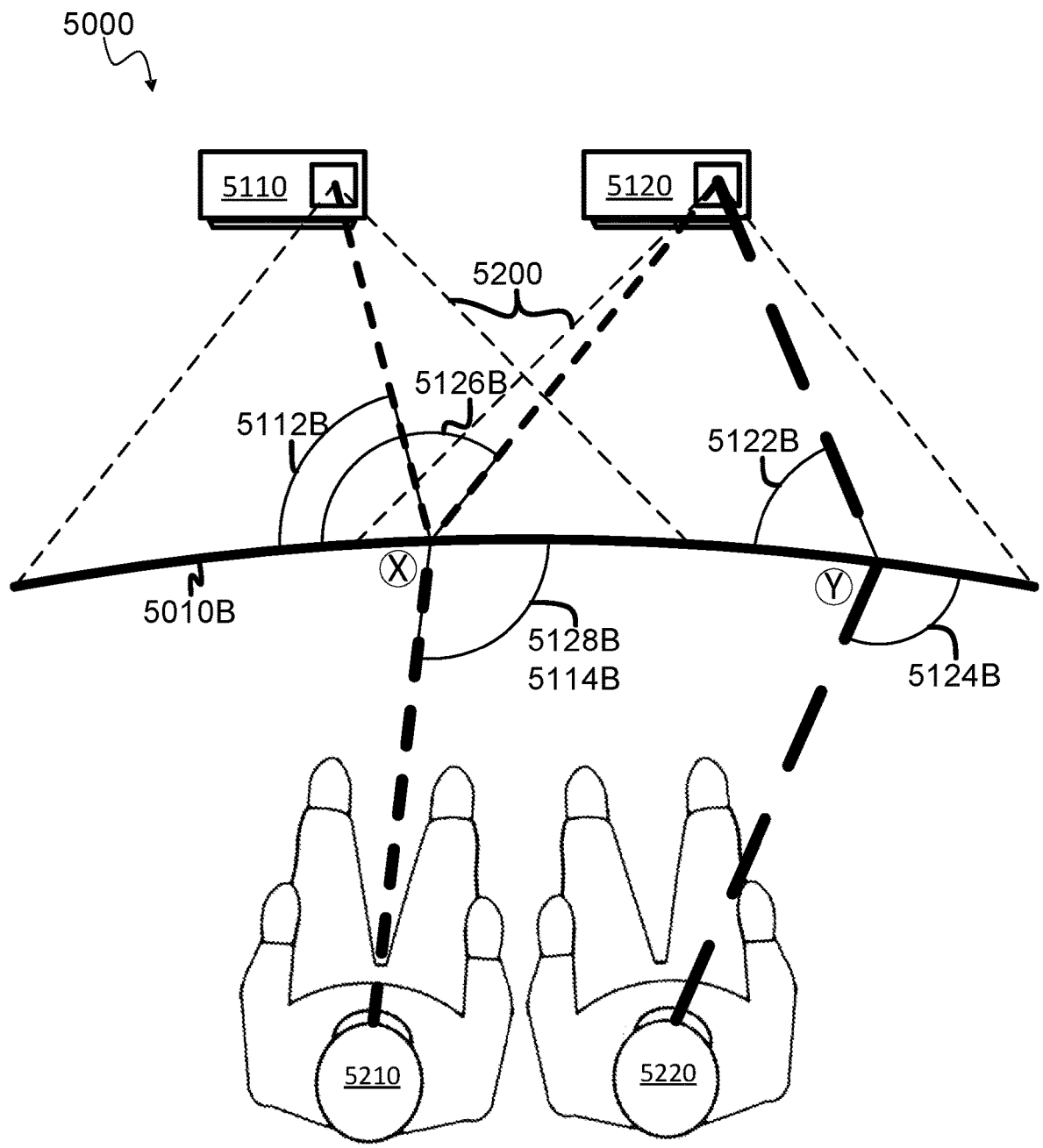

FIG. 4A, FIG. 4B and FIG. 4B, hereinafter referred to as FIG. 4, present an exemplary display system 5000 with different examples of display screens 5010A and 5010B. In the exemplary display system 5000, the two screens 5010A and 5010B are curved different, but both are rear-display screens. Skilled persons will readily understand that a flat display screen could also be used. Two rear-screen projectors 5110 and 5120 are, in the depicted examples, emitting light toward the screens 5010A and 5010B. Skilled persons will recognize that the present invention can function with front-screen projectors. Likewise, other technologies light-emitting technologies could also be used to display images (DEL, plasma or other light-emitting panels) instead of the depicted projectors. The number of projectors is chosen to exemplify the teachings of the present invention, but the display system 5000 could present one or more light-emitting device as demonstrated herein.

Each of the projectors 5110 and 5120 is shown sending a light beam 5200 towards the screens 5010A, 5010B. Of course, it will be understood that different projectors may present different characteristics and that the projectors do not need to be equivalent in the display system 5000 so long as the characteristics of each of the light-emitting devices in the display system 5000 is predictable. The light beams 5200 from the projectors 5110 and 5120 are seen as overlapping over a respective overlapping region of the screens 5010A and 5010B. In practice, the overlapping region may be limited to a few degrees (e.g., 3-10 degrees as seen from an expected user's position). Furthermore, skilled persons will readily understand that the number of overlapping regions, their shape and/or their width does not affect the teachings of the present invention so long as the configuration of the overlapping regions in the display system 5000 is predictable.

The display system 5000 shows two users 5210 and 5220 to exemplify that, in certain embodiments, different streams of images could be affected differently for different users of the display system 5000. The display system 5000 could function with one user and could also be made to function with more than two users when more than two streams of images can be made discernible from one another. Furthermore, in certain embodiments, only luminance differs between the different streams of images.

In certain embodiments, the users 5210 and 5220 are trainees in an interactive training computer simulation system. In such examples, the users 5210 and/or 5220 would have access to an instrument module (e.g., the instrument module 1160) to dynamically interact within an interactive training computer simulation running therein and the screen 5010A, 5010B would be used to display a graphical user interface (e.g., the GUI module 1150) for the users 5210 and 5220.

Figure 4C:
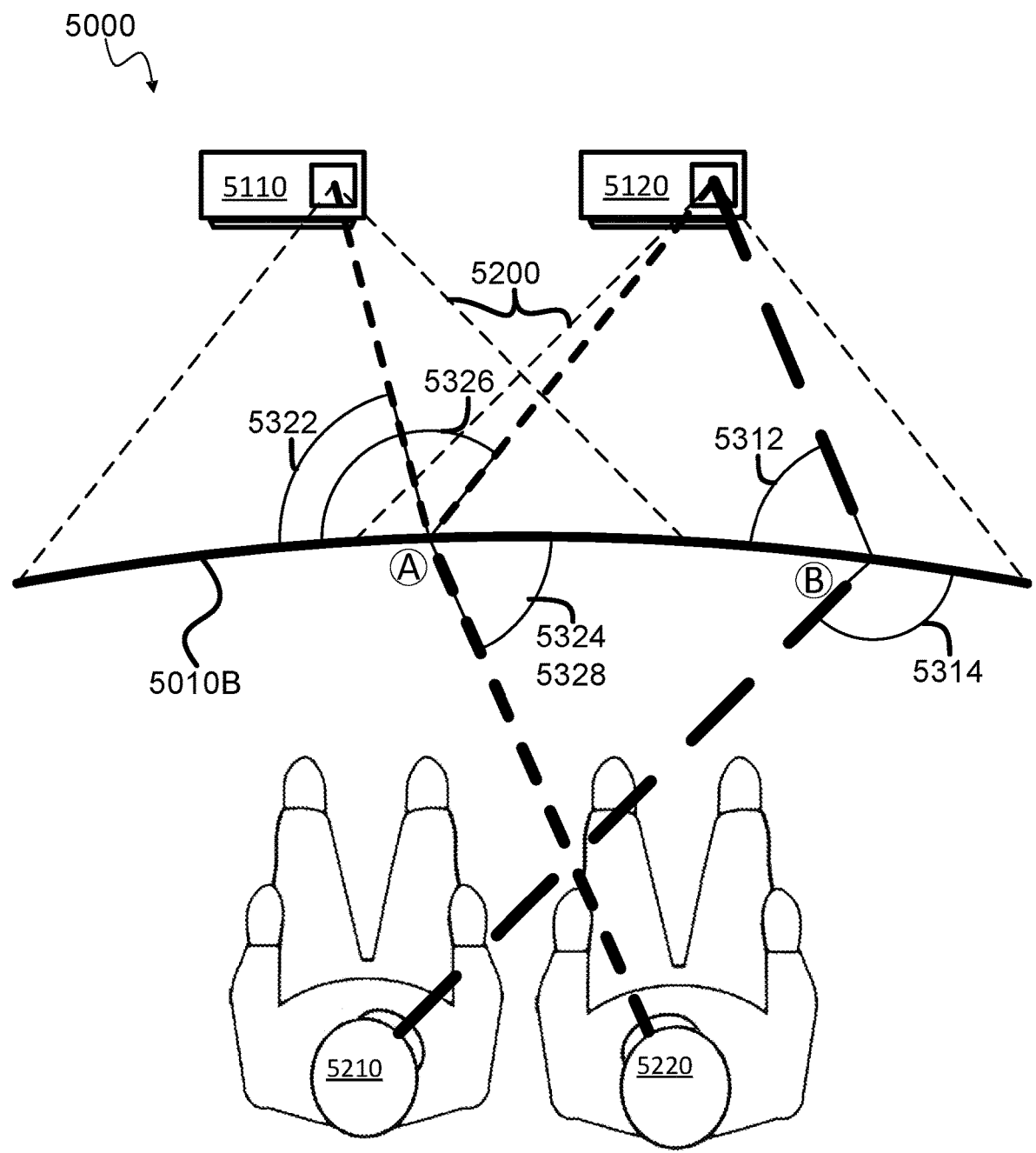

On FIG. 4, the user 5210 is shown, for the purpose of illustration, looking towards point X (FIGS. 5A and 5B) and towards point Y (FIG. 4C) and the user 5220 is shown looking towards point Y (FIGS. 5A and 5B) and towards point X (FIG. 4C). As can be readily appreciated points A and B were chosen to exemplify the teachings of the invention. The screens 5010A and 5010B are depicted in two dimension, but skilled reader will appreciated that curvature of the screens may also alternatively or additionally be provided along another axis (i.e., 2D curvature or 3D curvature). When discussing angles in the forthcoming discussion, reference will be made in 2D for easier reference, but skilled persons will appreciate how to adapt the teachings to other 2D or 3D setups. Furthermore, the different angles are presented in FIG. 4 relative to the surface of the screen rather than to a normal to the surface in order to improve the figure readability. However, the manner in which the angle is presented does not affect the teachings of the invention as skilled persons will readily understand.

When the user 5220 looks towards point Y, the light emitted from the projector 5120 is received on the screen 5010A with an angle depicted as 5112A or on the screen 5010B with an angle depicted as 5112B and the user 5220 sees the light received on the screen 5010A or 5010B at point Y with respective angles depicted as 5124A or 5124B. As can be appreciated, the various angles are affected by many different factors: the position of the light source (e.g., projectors), the position/rotation of the screen, the curvature of the screen (or lack thereof), the point at which the user looks and the position of the user (e.g., the user's eyes). In the context of the display system 5000, some of these factors are fixed (i.e., position of the light source, the position/rotation of the screen, the curvature of the screen) while others are dynamic (the point at which the user looks and the position of the user). In legacy display systems, the position of the user will also be considered to be fixed and the point at which the user looks will be considered unknown. The legacy display systems will therefore use a single setting to accommodate the most expected or the most important scenario (e.g., the user looking straight ahead from a seated position. In the display system 5000, the point at which the user looks and the position of the user will be determined from one more measurements made dynamically while images are being displayed, as will be better understood with reference to the examples depicted in the figures and described herein.

Figure 2:
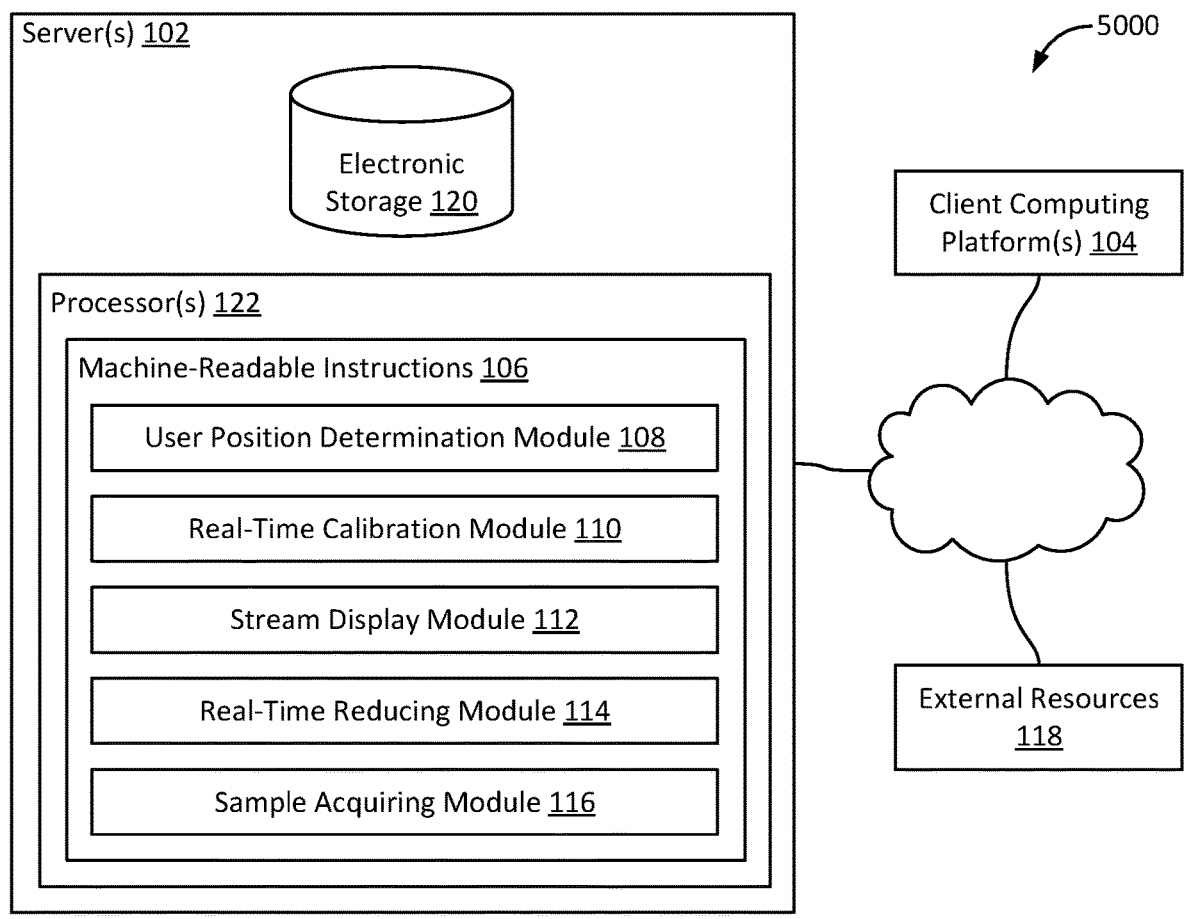
FIG. 2 is a modular view of an exemplary display system in accordance with the teachings of the present invention.

Reference is now made to FIG. 2 and FIG. 4. The display system 5000 is configured for dynamically adjusting image characteristics in real-time for the user therein a system, in accordance with one or more implementations of the present invention. The display system 5000 includes one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures.

Server(s) 102 may be configured by machine-readable instructions 106. Machine-readable instructions 106 may include one or more instruction modules. The instruction modules may include computer program modules. The instruction modules may include one or more of a user position determination module 108, a real-time calibration module 110, a stream display module 112, a sample acquiring module 116, and/or other instruction modules.

User position determination module 108 may be configured to determine in real-time a dynamic user position facing one or more fixed display screens. Determining the dynamic user position may further include determining, in real-time, a relative view angle between the dynamic user position and the one or more fixed display screens.

Real-time calibration module 110 may be configured to calibrate in real-time, taking into account the dynamic user position, luminance of a plurality of zones in a stream of images computed for display on the one or more fixed display screens. Adjusting in real-time the luminance of the plurality of zones in the stream of images may be further performed taking into account the relative view angle. The plurality of zones may include at least one non-blend zone on a single screen of the one or more fixed display screens.

User position determination module 108 may be configured to determine in real-time a second dynamic user position facing the one or more fixed display screens. The stream of images may include at least a second stream of images discernible in the stream of images by a second user.

Real-time calibration module 110 may be configured to calibrate in real-time, taking into account the dynamic user position, color properties of the plurality of zones in the stream of images computed for display on the one or more fixed display screens. Real-time calibration module 110 may be configured to calibrate in real-time, taking into account the second dynamic user position, luminance of the plurality of zones in the second stream of images computed for display on the one or more fixed display screens.

Stream display module 112 may be configured to display the calibrated stream of images onto the one or more fixed display screens. Displaying the calibrated stream of images onto the one or more fixed display screens may be performed using a plurality of projectors and the plurality of zones may include a blend zone on the one or more fixed display screens caused by at least one overlap between the plurality of projectors.

Real-time calibration module 110 may be configured to reduce in real-time, taking into account the relative view angle, luminance of one or more zones outside of a field of view defined for the user thereby improving image contrast in the plurality of zones in the stream of images.

Sample acquiring module 116 may be configured to acquire luminance samples from a plurality of expected user positions in the display system 5000. Adjusting the luminance in real-time may then be performed considering one or more of the acquired luminance samples. Determining in real-time the dynamic user position may be performed by interpolating the dynamic user position between two or more sampled view angles.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 5000 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of display system 5000, external entities participating with the display system 5000, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 2 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, and/or 116, and/or other modules. Processor(s) 122 may be configured to execute modules 108, 110, 112, 114, and/or 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and/or 116 are illustrated in FIG. 2 as being implemented within a single processing unit, in implementations in which processor(s) 122 includes multiple processing units, one or more of modules 108, 110, 112, and/or 116 may be implemented remotely from the other modules. The description of the functionality provided by the different modules 108, 110, 112, and/or 116 described below is for illustrative purposes, and is not intended to be limiting, as any of modules 108, 110, 112, and/or 116 may provide more or less functionality than is described. For example, one or more of modules 108, 110, 112, and/or 116 may be eliminated, and some or all of its functionality may be provided by other ones of modules 108, 110, 112, and/or 116. As another example, processor(s) 122 may be configured to execute one or more additional modules that may perform some or all of the functionality attributed below to one of modules 108, 110, 112, and/or 116.

Figure 3:
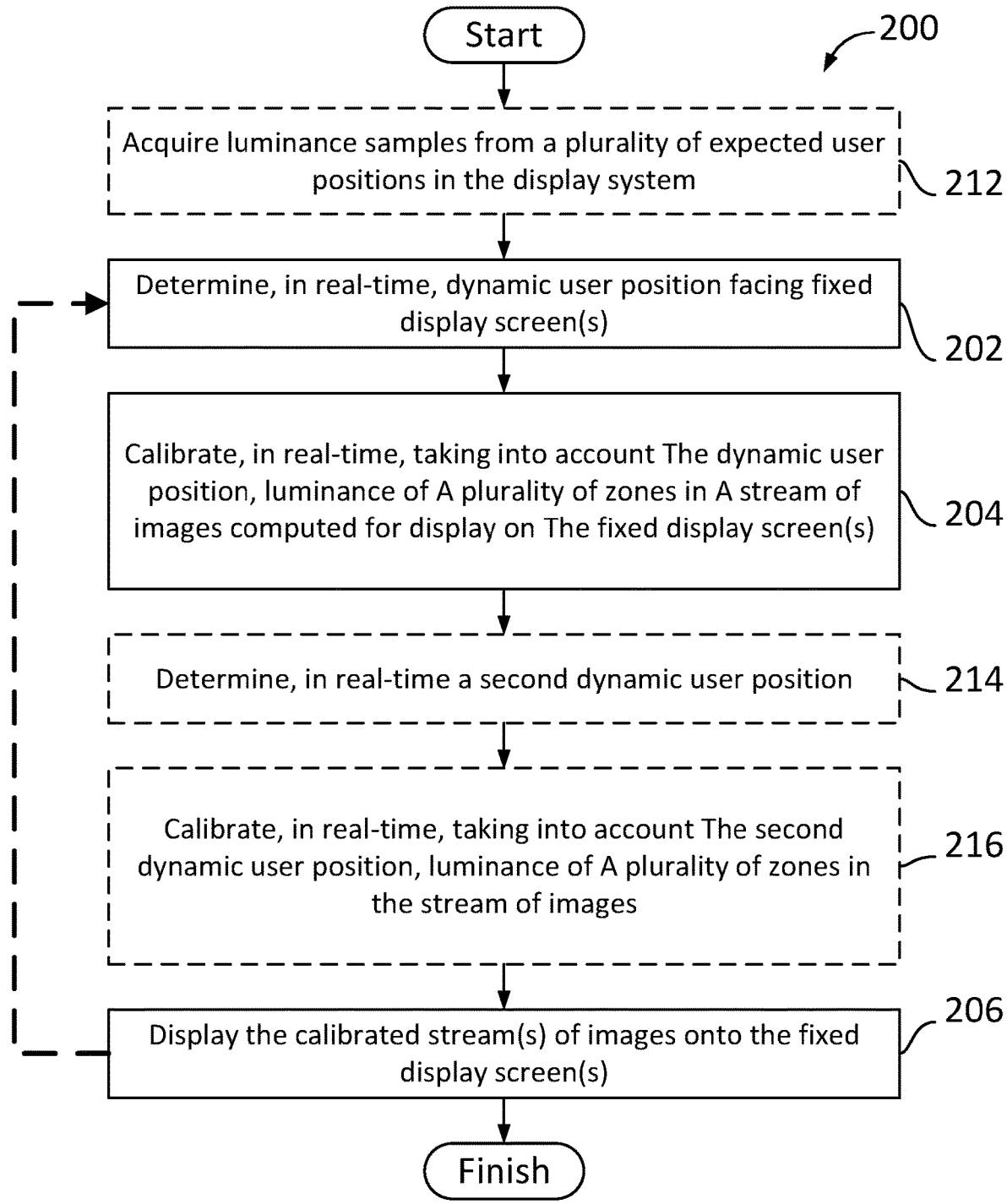
FIG. 3 is a flow chart of an exemplary method in accordance with the teachings of the present invention.

FIGS. 3A, 3B, 3C, 3D, and/or 3E, herein after referred to as FIG. 3, illustrates a method 200 for dynamically adjusting image characteristics in real-time for user in a system, in accordance with one or more implementations. The operations of method 200 presented below are intended to be illustrative. In some implementations, the method 200 may be accomplished with one or more additional operations not described, and/or without one or more of the operations discussed. Additionally, the order in which the operations of the method 200 are illustrated in FIGS. 2A, 2B, 2C, 2D, and/or 2E and described below is not intended to be limiting.

In some implementations, the method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 200 in response to instructions stored electronically on an electronic storage medium. The one or more processing devices may include one or more devices configured through hardware, firmware, and/or software to be specifically designed for execution of one or more of the operations of the method 200.

FIG. 3 illustrates the method 200, in accordance with one or more implementations. An operation 202 may include determining in real-time a dynamic user position facing one or more fixed display screens. Operation 202 may be performed by one or more hardware processors configured by machine-readable instructions including a module that is the same as or similar to user position determination module 108, in accordance with one or more implementations. In some implementations, the operation 202 may be performed by one or more hardware processors configured by machine-readable instructions including a module that is the same as or similar to the processor module 1130 and/or the instrument module 1160, in accordance with one or more implementations.

An operation 204 may include adjusting in real-time, taking into account the dynamic user position, luminance of a plurality of zones in a stream of images computed for display on the one or more fixed display screens. Operation 204 may be performed by one or more hardware processors configured by machine-readable instructions including a module that is the same as or similar to real-time calibration module 110, in accordance with one or more implementations. In some implementations, the operation 204 may be performed by one or more hardware processors configured by machine-readable instructions including a module that is the same as or similar to the processor module 1130, the dedicated graphics unit 1132 and/or the GUI module 1150, in accordance with one or more implementations.

An operation 206 may include displaying the calibrated stream of images onto the one or more fixed display screens. Operation 206 may be performed by one or more hardware processors configured by machine-readable instructions including a module that is the same as or similar to stream display module 112, in accordance with one or more implementations. In some implementations, the operation 206 may be performed by one or more hardware processors configured by machine-readable instructions including a module that is the same as or similar to the processor module 1130, the dedicated graphics unit 1132 and/or the GUI module 1150, in accordance with one or more implementations.

An operation (not shown) may further include reducing in real-time, taking into account the relative view angle, luminance of one or more zones outside of a field of view defined for the user thereby improving image contrast in the plurality of zones in the stream of images, which may be performed by one or more hardware processors configured by machine-readable instructions including a module that is the same as or similar to real-time calibration module 110 and/or the processor module 1130, in accordance with one or more implementations.

An operation (not shown) may include further including adjusting in real-time, taking into account the dynamic user position, color properties of the plurality of zones in the stream of images computed for display on the one or more fixed display screens, which may be performed by one or more hardware processors configured by machine-readable instructions including a module that is the same as or similar to real-time calibration module 110 and/or the processor module 1130, in accordance with one or more implementations.

The method 200 may, in certain implementations, further include an operation 212 including acquiring luminance samples from a plurality of expected user positions in the system and wherein adjusting the luminance in real-time is performed considering one or more of the acquired luminance samples. Determining in real-time the dynamic user position 202 may be performed by interpolating the dynamic user position between two or more sampled view angles. Operation 212 may be performed by one or more hardware processors configured by machine-readable instructions including a module that is the same as or similar to sample acquiring module 116, in accordance with one or more implementations. In some implementations, the operation 212 may be performed by one or more hardware processors configured by machine-readable instructions including a module that is the same as or similar to the processor module 1130, and/or the tangible instrument module 1160, in accordance with one or more implementations.

The method 200 may, in certain implementations, further include an operation 214 including determining in real-time a second dynamic user position facing the one or more fixed display screens. Operation 214 may be performed by one or more hardware processors configured by machine-readable instructions including a module that is the same as or similar to user position determination module 108, in accordance with one or more implementations. The method 200 may, in certain implementations, also further include an operation 216 including adjusting in real-time, taking into account the second dynamic user position, luminance of the plurality of zones in the second stream of images computed for display on the one or more fixed display screens. Operation 216 may be performed by one or more hardware processors configured by machine-readable instructions including a module that is the same as or similar to real-time calibration module 110, in accordance with one or more implementations. In some implementations, the operation 214 and/or the operation 216 may be performed by one or more hardware processors configured by machine-readable instructions including a module that is the same as or similar to the processor module 1130, the dedicated graphics unit 1132 and/or the GUI module 1150, in accordance with one or more implementations.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for dynamically adjusting image characteristics in real-time for a user in a system, the method comprising:
   determining in real-time a dynamic user position facing one or more fixed display screens;
   determining in real-time a relative view angle between the dynamic user position and the one or more fixed display screens;
   calibrating a stream of images to produce a calibrated stream of images, by:
      adjusting in real-time, taking into account the dynamic user position, luminance of a plurality of zones in the stream of images computed for display on the one or more fixed display screens; and
      reducing in real-time, taking into account the relative view angle, luminance of one or more zones outside of a field of view defined for the user thereby improving image contrast in the plurality of zones in the stream of images; and
   displaying the calibrated stream of images onto the one or more fixed display screens.

2. The method of claim 1, wherein adjusting in real-time the luminance of the plurality of zones in the stream of images is further performed taking into account the relative view angle.

3. The method of claim 1, wherein displaying the calibrated stream of images onto the one or more fixed display screens is performed using a plurality of projectors and wherein the plurality of zones comprises a blend zone on the one or more fixed display screens caused by at least one overlap between the plurality of projectors.

4. The method of claim 1, wherein the plurality of zones comprises at least one non-blend zone on a single screen of the one or more fixed display screens.

5. The method of claim 1 further comprising adjusting in real-time, taking into account the dynamic user position, color properties of the plurality of zones in the stream of images computed for display on the one or more fixed display screens.

6. The method of claim 1 further comprising acquiring luminance samples from a plurality of expected user positions in the system and wherein adjusting the luminance in real-time is performed considering one or more of the acquired luminance samples, wherein determining in real-time the dynamic user position is performed by interpolating the dynamic user position between two or more sampled view angles.

7. The method of claim 1, wherein the stream of images comprises at least a second stream of images discernible in the stream of images by a second user, the method further comprising:
   determining in real-time a second dynamic user position facing the one or more fixed display screens; and
   adjusting in real-time, taking into account the second dynamic user position, luminance of the plurality of zones in the second stream of images computed for display on the one or more fixed display screens.

8. A display system configured for dynamically adjusting image characteristics in real-time for a user therein, the display system comprising:
   one or more fixed display screens;
   one or more hardware processors configured by machine-readable instructions to:
      determine in real-time a dynamic user position facing the one or more fixed display screens;
      determine, in real-time, a relative view angle between the dynamic user position and the one or more fixed display screens;
      calibrate a stream of images to produce a calibrated stream of images, by:
         adjusting, in real-time, taking into account the dynamic user position, luminance of a plurality of zones in the stream of images computed for display on the one or more fixed display screens; and
         reduce in real-time, taking into account the relative view angle, luminance of one or more zones outside of a field of view defined for the user thereby improving image contrast in the plurality of zones in the stream of images; and
      display the calibrated stream of images onto the one or more fixed display screens.

9. The display system of claim 8, wherein the one or more hardware processors are further configured by machine-readable instructions to adjust in real-time the luminance of the plurality of zones in the stream of images taking into account the relative view angle.

10. The display system of claim 8, further comprising a plurality of projectors, wherein the one or more hardware processors are further configured by machine-readable instructions to display the calibrated stream of images onto the one or more fixed display screens using the plurality of projectors and wherein the plurality of zones comprises a blend zone on the one or more fixed display screens caused by at least one overlap between the plurality of projectors.

11. The display system of claim 8, wherein the plurality of zones comprises at least one non-blend zone on a single screen of the one or more fixed display screens.

12. The display system of claim 8, wherein the one or more hardware processors are further configured by machine-readable instructions to adjust in real-time, taking into account the dynamic user position, color properties of the plurality of zones in the stream of images computed for display on the one or more fixed display screens.

13. The display system of claim 8, wherein the one or more hardware processors are further configured by machine-readable instructions to:
   acquire luminance samples from a plurality of expected user positions in the system, and
   adjust the luminance in real-time considering one or more of the acquired luminance samples, wherein determining in real-time the dynamic user position is performed by interpolating the dynamic user position between two or more sampled view angles.

14. The display system of claim 8 further comprising a dedicated image generator module for computing the stream of images.

15. The display system of claim 8, wherein the stream of images comprises at least a second stream of images discernible in the stream of images by a second user and wherein the one or more hardware processors are further configured by machine-readable instructions to:
   determine in real-time a second dynamic user position facing the one or more fixed display screens; and
   adjust in real-time, taking into account the second dynamic user position, luminance of the plurality of zones in the second stream of images computed for display on the one or more fixed display screens.

16. The display system of claim 8, wherein image polarization is used to ensure discernibility in the stream of images.

17. The display system of claim 8, further comprising:
an instrument module comprising at least one physical interface element to the user;
the one or more hardware processors being further configured by machine-readable instructions to:
load a simulation model from at least one simulation database for generating the stream of images;
manage a computer simulation by computing the simulation model from inputs obtained from the instrument module and a plurality of simulation parameters of the computer simulation.

18. A non-transitory computer-readable storage medium having instructions stored thereon, the instructions being executable by one or more processors to perform a method for dynamically adjusting image characteristics in real-time for a user in a system, the method comprising:
determining in real-time a dynamic user position facing one or more fixed display screens;
determining in real-time a relative view angle between the dynamic user position and the one or more fixed display screens;
calibrating a stream of images to produce a calibrated stream of images, by:
adjusting in real-time, taking into account the dynamic user position, luminance of a plurality of zones in the stream of images computed for display on the one or more fixed display screens;
reducing in real-time, taking into account the relative view angle, luminance of one or more zones outside of a field of view defined for the user thereby improving image contrast in the plurality of zones in the stream of images; and
displaying the calibrated stream of images onto the one or more fixed display screens.

* * * * *